Patented Mar. 1, 1932

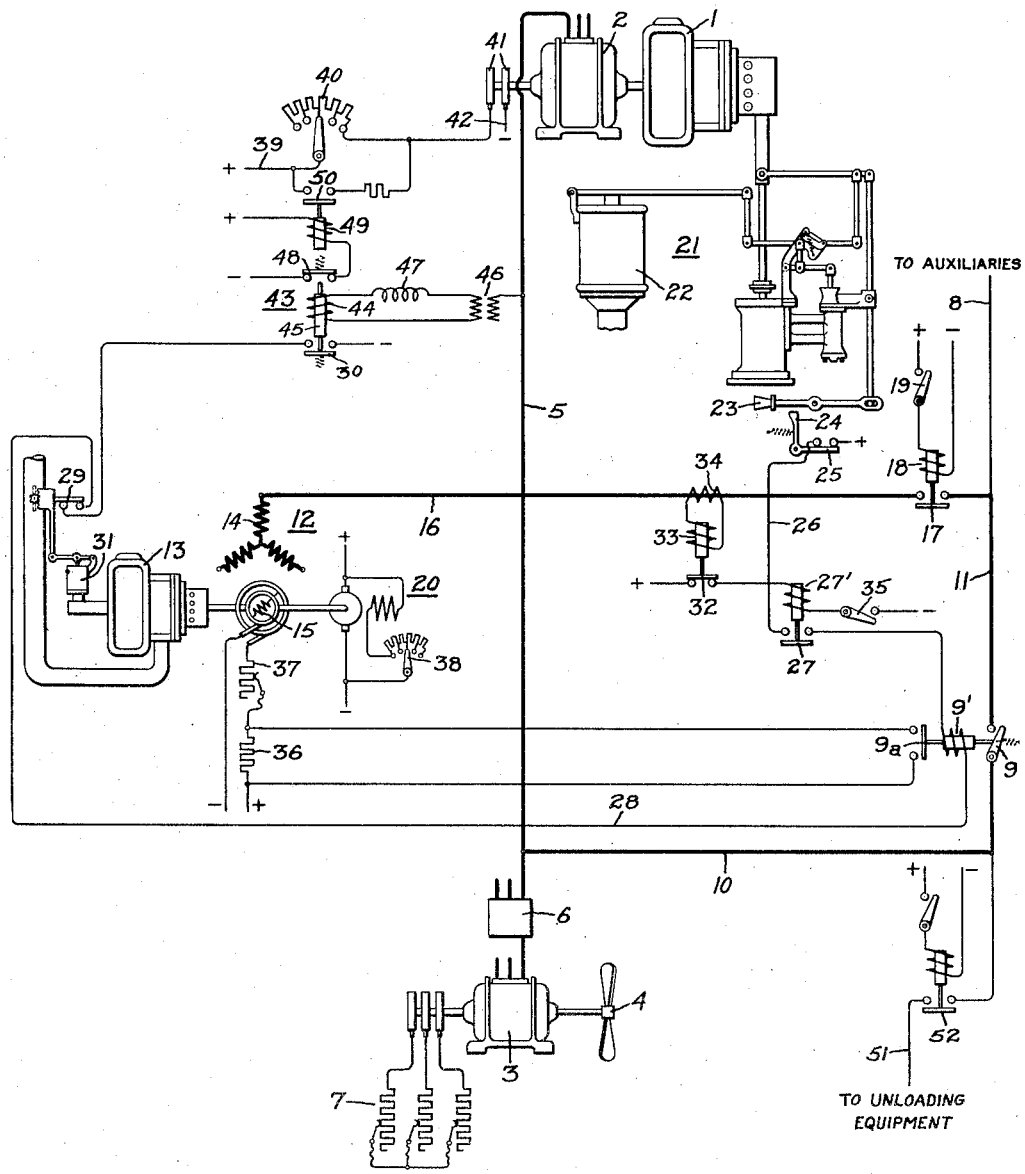

1,847,950

UNITED STATES PATENT OFFICE

ALEXANDER KENNEDY, JR., OF SCHENECTADY, NEW YORK, ASSIGNOR TO GENERAL ELECTRIC COMPANY, A CORPORATION OF NEW YORK

POWER SYSTEM

Application filed November 1, 1927. Serial No. 230,333.

My invention relates to improvements in power systems and more particularly to electric power systems for ship propulsion.

One type of ship propulsion system to which my improvements may be applied comprises a main prime mover driving a generator which supplies power to a motor or motors for driving the ship's propeller or propellers. Such a power system comprises a very considerable amount of auxiliary equipment which must be operated either all of the time the main prime mover is in operation or a considerable part of the time. Where the main prime mover is a steam turbine, for example, such auxiliary equipment will comprise the boiler feed pump for supplying water to the boilers which generate steam for the turbine. Likewise there will be condenser water circulating and condensate pumps. In addition there will be draft fans for the boilers, ventilating and cooling fans, devices for handling fuel, cargo, etc. and lighting devices for the ship. Where the prime mover is an internal combustion engine certain of this auxiliary equipment will be omitted but pumps, compressors and the like are needed for the proper operation of the engine. Prime movers can be made to operate more efficiently in large sizes. The amount of power required for the auxiliary equipment is so great in a modern power station, whether on land or on shipboard, that the efficiency of the plant is materially reduced if relatively inefficient apparatus is provided for operating the auxiliaries. It has therefore been proposed to operate such auxiliaries by electric motors which receive their power from the main generator driven by the main prime mover or by a special generator driven by said prime mover. Such an arrangement is more efficient than where small turbines or reciprocating engines are provided to drive the individual units of the auxiliary equipment or by means of relatively small turbine generators.

It is vital to the operation of the main power unit that some of the auxiliary equipment be kept in substantially continuous operation. This is true for example of the boiler feed pump of a steam plant. If a generator driven by the main turbine of such plant should become an unsuitable source of power for the motor driving the boiler feed pump the whole plant would be shut down. To increase the reliability of service it has been proposed to provide two sources of power for driving important units of the auxiliary equipment, one of which is a motor normally operated from the main generator. When this motor drive fails, the other source of power, which may be a prime mover, is put into operation to keep the auxiliary device in operation. Such an arrangement is disclosed for example in Letters Patent to Clarke 1,185,288, dated May 30, 1916. In the Clarke arrangement the auxiliary unit is normally driven by an induction motor supplied from the main power system and on the shaft of the auxiliary unit there is a steam turbine which is driven idle while the motor is in operation. When the motor speed drops, the governor on the turbine automatically opens to admit steam to the turbine to drive the auxiliary device. In such an arrangement a reverse power relay has been used between the induction motor and the main system to open the circuit of the induction motor and prevent supply of power from the induction motor to the main system while the auxiliary turbine is in operation. According to this arrangement a dual drive is provided for certain important auxiliaries.

Another arrangement which has been proposed involves the use of a so-called house turbine for driving a generator which supplies the motor operated auxiliaries independently of the main power unit. This arrangement gives increased reliablity of service but the efficiency is lower than where the auxiliary equipment is operated from the main generator. A variation of this latter arrangement for land stations consists in operating the generator of the auxiliary or house turbine as a motor from the main generator when the main generator is in operation and in admitting steam to the auxiliary turbine to operate the motor as a generator to supply the auxiliary equipment when the main generator fails. My invention relates to an improved system of this last mentioned type and while many features of my invention are applicable to power systems generally my invention is of particular utility in systems of ship propulsion.

Referring, for example, to an electrically driven cargo boat the amount of power required for the auxiliary equipment is so great that if steam turbine or reciprocating drives are used for such equipment the water rate is so high that the operation of the ship becomes unduly expensive, although the water rate of the main unit may be very good. In accordance with my invention I am enabled to operate the auxiliary equipment from the main generator whenever the main generator constitutes a suitable source of power for supplying power to such equipment and to insure that the equipment is maintained in operation notwithstanding the various conditions inherent in a ship propulsion system which make it difficult to utilize the main generator as a source for supplying such auxiliary equipment. For example, where the propeller is driven by an induction or synchronous motor supplied from a synchronous generator driven by the main turbine, the speed of the ship is customarily controlled by adjusting the speed of the turbine. If we assume, for example, that the frequency of the generator at full speed is 60 cycles this frequency will be proportionally reduced when the speed of the turbine is reduced to operate the ship at a lower speed. If the main generator has substantially constant excitation the voltage of the generator will also be correspondingly reduced. The variations in frequency and voltage of the main generator which are brought about by speed changes for maneuvering the ship make the main generator frequently unsuitable as a source of supply for the auxiliary equipment. Naturally the operation of the main generator is adjusted in accordance with the requirements of the propeller driving motor, which is designed and controlled in various ways well known to the art, to enable it to operate throughout a wide speed adjustment of the main generator. In accordance with my invention I provide an auxiliary source of supply for the auxiliary equipment which auxiliary source is not called upon to furnish any power while the main generator constitutes a suitable source of power but which is brought into operation automatically by various control devices when the main generator becomes an unsuitable source of power for such equipment. I am therefore enabled to increase the efficiency of the power system as a whole by taking advantage of the relatively greater efficiency of the main prime mover to operate the auxiliary equipment throughout most of the time the ship is in operation, while calling upon a relatively inefficient source only when the main prime mover is an unsuitable source of power for such equipment.

My invention will be better understood from the following description considered in connection with the accompanying drawing and its scope will be pointed out in the appended claims.

The drawing shows diagrammatically one embodiment of my invention applied to a ship propulsion system.

In the drawing, the main prime mover 1, diagrammatically shown as a steam turbine, drives the main generator 2 which is diagrammatically indicated as a three phase synchronous generator. The generator 2 is connected to the propeller driving motor 3, the ship's propeller being indicated at 4. Power flows from the generator 2 to the motor 3 through the circuit 5. In order to simplify the drawing only one conductor of the three conductors of the three phase circuit is carried through on the drawing. Suitable control equipment is provided for controlling the circuit between the generator and propeller driving motor but since such control equipment forms no part of my present invention I have merely indicated diagrammatically, at 6, that there is a switching means between the generator and the motor. Where an induction motor is used to drive the propeller, means may be provided for controlling the resistance in its secondary circuit during maneuvering operations such as starting and stopping. This resistance is diagrammatically indicated at 7, but, as pointed out hereinafter, my invention is not limited to any particular type of motor.

The auxiliary equipment is supplied from the circuit 8. To simplify the drawing the various motors supplied from the circuit 8 are not illustrated but the presence of such equipment is indicated by the legend—to auxiliaries—applied to the circuit. A circuit controlling means shown diagrammatically as a switch 9 is provided between the auxiliary work circuit 8 and the main work circuit 5. The circuit from the generator 2 to the auxiliary circuit 8 is diagrammatically shown as leading through the conductor 5, the conductor 10, switch 9, conductor 11 to circuit 8. Here again only one of the three conductors is shown in order to simplify the drawing. It will be understood that in the three phase installation illustrated the switch 9 will be a three phase switch and in actual practice the switch may be a remotely controlled oil switch or air switch.

The auxiliary source for furnishing power to operate the auxiliary circuit 8 when the main generator 2 is unsuitable, is shown as a synchronous dynamo-electric machine 12 on the shaft of which is an auxiliary prime mover 13 diagrammatically indicated as a steam turbine. The dynamo-electric machine 12 illustrated comprises a three phase stator winding 14 and a field element 15 mounted on the shaft of the auxiliary prime mover 13. The stator 14 of the dynamo-electric machine 12 is connected to the auxiliary circuit 8. One of the three phase conductors 16 is shown connecting the machine 12 through the switch 17 to the auxiliary circuit. The switch 17 may be a remotely controlled oil switch or air switch. The drawing diagrammatically indicates that the switch 17 is closed when the solenoid 18 is energized by closing the switch 19.

When the main generator 2, which supplies the work circuit 5, is operating under conditions which make it suitable for supplying the auxiliary circuit 8, the switches 9 and 17 are both closed and the generator 2 not only supplies the auxiliary equipment, but, through the switch 17, also supplies power to the dynamo-electric machine 12 which then operates as a motor and drives the turbine 13 and also, in the arrangement shown, drives the exciter 20 which, as hereinafter pointed out, supplies the field circuit of the dynamo-electric machine 12.

In order to regulate and adjust the speed of the main turbine 1 suitable governing and adjusting means 21 are provided. It is immaterial as far as my present invention is concerned whether the governor is of the oil pressure or some other type. The governor diagrammatically illustrated is of the type shown in Letters Patent to Emmet 1,137,308, dated April 27, 1915. This type of governor comprises a centrifugal element 22 which operates to maintain the speed of the turbine constant. For any speed setting of the speed lever 23, the governor maintains the turbine speed constant notwithstanding changes in load on the generator due to conditions of operation of the ship. Such changes in load may be brought about by headwinds or waves or the maneuvering of the ship. Moreover where a ship moves from deep water into comparatively shallow water so that the bottom of the ship comes near to the ground, the power required to operate the ship increases considerably. For all such conditions the governor keeps the speed of the turbine substantially constant for any given position of the speed lever 23.

A stop device 24 is provided for limiting the movement of the speed lever 23 in a direction to reduce the speed of the turbine. This stop device may be set to stop the speed lever at any predetermined desired position. With a turbine driven generator and electric drive of the propeller, I prefer to set the stop device to stop the speed lever in about the ¾ speed position. As an example, the speed lever 23 may have twenty operating points from a minimum-speed setting corresponding for example to 1200 R. P. M. to the full-speed setting. The stop may have a setting at approximately 2700 R. P. M. and the turbine speed may be varied between 3600 R. P. M. and 2700 R. P. M. without moving the stop device. If it is desired to go below 2700 R. P. M. this stop must be moved. In accordance with my invention I provide means whereby movement of this stop device opens the switch 9 so as to insure the disconnection of the main generator 2 from the auxiliary circuit 8 before the speed lever can be moved below its ¾ speed position. Although the switch 9 is opened, the dynamo-electric machine 12 is left connected to the auxiliary circuit through the switch 17, and the turbine 13 is arranged to supply power to drive the machine 12 as a generator to supply power to the auxiliary circuit when the main generator 2 is thus disconnected. The auxiliary equipment is thus maintained in operation from the auxiliary source if the main generator speed is decreased below 2700 R. P. M. in the example mentioned.

Various means may be provided whereby the adjustment of the speed lever 23 beyond a predetermined position disconnects the main generator from the auxiliary circuit. In the arrangement illustrated in the drawing the control circuit for the switch 9 comprises a solenoid 9' and movement of the stop device 24 moves the contact 25 to open the control circuit thereby causing the switch 9 to open. The control circuit leads from a suitable source indicated by the (+) sign through the contact 25, the lead 26, through a contact 27 operated by a solenoid 27', through the solenoid 9', the lead 28, through a contact 29 controlled by the valve setting of the auxiliary turbine 13 provided for a purpose hereinafter described, and through a contact 30 controlled by a volts-per-cycle relay as hereinafter described, to the other side of the control circuit indicated by the (−) sign. The control circuit just traced may be supplied from the exciter 20, but for the purpose of simplifying the diagram the connecting lines have not been shown. While the main generator 2 is operating under conditions suitable for supplying the auxiliary equipment the various contacts in the control circuit are all closed, but when the speed is adjusted below ¾ speed the contact 25 is opened and the generator 2 disconnected as just described.

The auxiliary prime mover 13 is provided with a suitable speed governor 31 which is set to increase the power of the prime mover whenever its speed tends to fall below a predetermined value, preferably substantially that corresponding to the normal speed which obtains when the speed lever 23 of the main turbine is at its ¾ speed setting. While the main generator 2 is operating above this speed and is supplying power to the auxiliary circuit, the prime mover 13 runs idle being driven by the dynamo-electric machine 12 which is then operating as a motor and floating on the auxiliary circuit. As soon as the switch 9 opens to disconnect the main generator from the auxiliary circuit, the machine 12 tends to slow down and the governor 31 operates to admit steam to the turbine to prevent any further drop in speed. The dynamo-electric machine 12 then operates as a synchronous generator to supply power to the auxiliary equipment.

If by some abnormal condition the speed of the main turbine should fall below a predetermined speed, which is 3/4 speed in the example given, with the speed lever 23 adjusted for a higher speed so that the stop device 24 maintains the control circuit contact 25 closed, the turbine 13 of the auxiliary unit would begin to drive the machine 12 as a generator and, with the switch 9 closed, the relatively small machine 12 would supply power to the work circuit 5. To prevent this undesired operation I provide means whereby the switch 9 is opened to disconnect the generator 2 from the auxiliary circuit when the admission valve or the like of the auxiliary prime mover 13 begins to open. In the arrangement illustrated the operation of the governor 31 to admit steam to the turbine 13 opens the contact 29 in the control circuit, so that the opening of the contact deenergizes the solenoid 9' to open the switch 9 just as the opening of the contact 25 on the stop device causes the switch to open. As an added precaution to insure that the machine 12 shall not supply power to the circuit 5 of the generator 2 and the main propeller motor 3, I provide means responsive to an overload on the machine 12 for opening the switch 9. In the arrangement illustrated, this overload means comprises a contact 32 in the circuit of the solenoid 27'. The contact 32 is controlled by a solenoid 33 supplied by a current transformer 34 connected in the lead 16 from the machine 12 to the auxiliary circuit 8. If the machine 12 becomes overloaded the contact 32 is opened thereby deenergizing the solenoid 27' to open the contact 27 and deenergize the solenoid 9' and open the switch 9. The switch 35 shown in the circuit of the solenoid 27' is merely a manually operated switch for opening or closing contact 27 when desired.

While the main generator 2 is supplying the auxiliary circuit 8, the dynamo-electric machine 12 is operating as a synchronous motor. If the field of a synchronous motor is over-excited the motor takes a leading current and improves the power factor of the circuit to which it is connected, as is well known to those ordinarily skilled in the art. In accordance with my invention I take advantage of this property of a synchronous motor by providing means to increase the excitation of the machine when the switch 9 is closed. In the arrangement shown an auxiliary contact 9a is operated simultaneously with the switch 9 and arranged, when the switch 9 is closed, to short-circuit a block of resistance 36 in the field circuit of the machine 12. The machine when operating as a synchronous motor is thus over-excited and improves the power factor of the system. This over excitation if maintained during the time the machine 12 is operating as a generator would produce a voltage higher than desired. With my arrangement the opening of the switch 9 by opening the contact 9a opens the short circuit around the resistance 36 thereby inserting this resistance in the field circuit of the machine 12 so as to reduce its voltage to the desired value. Means comprising an adjustable resistance 37 are provided for adjusting the energization of the field winding of the dynamo-electric machine 12 independently of the resistance 36.

During the time that the main turbine 1 is operating within the range of adjustment above that corresponding to the setting of the stop device 24, the speed of the main generator may be varied over a relatively wide range by the speed lever 23 as heretofore described. During this operation the speed of the dynamo-electric machine 12, then operating as a motor, will vary proportionally. Since, in the arrangement illustrated, the exciter 20 is on the shaft of the machine 12 the voltage of the exciter would also vary with such changes in speed. To prevent such variation in the exciter voltage suitable regulating means, indicated as a rheostat 38, is provided in the field circuit of the exciter. This regulating means in an actual installation will be made automatic in any suitable manner, many examples of which are well known in the art, so that the exciter voltage is automatically maintained substantially constant.

The exciting circuit for the main generator 2 is shown as leading from the connection 39 marked (+) through the adjustable rheostat 40 and the slip rings 41 which connect to the field member of the generator 2 to the lead 42 marked (−). The rheostat 40 is ordinarily manually adjusted by the operator to strengthen the excitation of the generator so as to prevent the propeller motor 3 from falling out of step on heavy loads and so as to weaken the field of the generator on light loads to reduce the heating of the field winding of the generator as much as possible while still maintaining stable operation of the propeller motor. The switchboard of the ship may, for example, be provided with an instrument termed a stability indicator which shows the operator whether or not the excitation ought to be increased to prevent the motor from falling out of step or decreased because the excitation is greater than necessary for stable operation. Such a stability indicator is disclosed in Letters Patent to Alexanderson, 1,461,571, dated July 10, 1923. Whether or not such a stability indicator is utilized, the fact remains that the excitation of the main generator is usually adjusted in accordance with the requirements of the propeller driving motor. Where, as in my arrangement, however, the auxiliary equipment is also supplied from the main generator, conditions may arise which interfere with satisfactory operation of the motors of the auxiliary equipment even though the speed range of the main turbine be above that determined by the setting of the stop device 24 and the excitation of the main generator be proper for the propeller motor. There are a number of reasons why the excitation of the main generator should be adjusted to suit the operating conditions of the motors of the auxiliary equipment. As far as possible the adjustment of the excitation of the main generator will be made in accordance with the requirements of the propeller motor, but I change that adjustment when a condition is approached which is dangerous or undesirable for the auxiliary equipment. As illustrative of the different conditions that may obtain on the main propeller motor and auxiliary motor, comparison may be made between the main propeller motor and a motor which drives a constant torque load. Such a load is represented for example by a motor which operates a drum to wind up a rope and lift a given weight. The power required to drive a ship varies approximately as the cube of the speed. The torque of the main propeller motor therefore varies approximately as the square of the speed. If we assume, for example, that a ship is operating at full speed the excitation of the main generator will be strong, in order to produce the power necessary for operating the propeller motor. With such normal speed a constant torque motor of the auxiliary equipment will of course be stable. If now the speed is assumed to be reduced by one half, the power required by the propeller driving motor will be reduced approximately to one eighth of its former value, and the torque of the propeller driving motor will need to be but one fourth its former value. Therefore for stable operation of the propeller motor the excitation of the main generator may be much reduced. Such reduction of the excitation of the main generator might, however, cause a constant torque motor of the auxiliary equipment to fall out of step because the torque required by that motor remains constant instead of being reduced to one fourth as in the case of the propeller motor. This example strikingly illustrates the fact that where the auxiliaries are to be operated from the main generator, the excitation of the main generator should be adjusted with proper regard to the requirements of the auxiliary equipment. Alternating current motors of the type used on auxiliary equipment are customarily designed to operate at substantially constant volts per cycle, that is to say, if the normal frequency of the system is 60 cycles and the normal voltage 2400 volts, the voltage of the generator should be adjusted to 1800 volts when the frequency has been reduced to 45 cycles. These figures are approximate only. To obtain maximum efficiency with a normally designed induction motor it may be necessary to decrease the voltage slightly less than the decrease in frequency. In other words with reduced frequency, the volts per cycle should be slightly increased. The ventilation of any self-ventilated motor decreases with its speed, and with a given speed range as for ship propulsion, it is desirable to keep the volts per cycle practically constant if standard motors are to be utilized. The efficiency of the main propelling motor may or may not be decreased by keeping constant volts per cycle compared with varying the voltage at a greater rate than the frequency, depending upon whether or not a maximum efficiency point of the motor has been reached, and if this point has not been reached the maintenance of constant volts per cycle may actually increase the efficiency of the propeller motor. By keeping the volts per cycle substantially constant standard induction motors may be used and maintained within the same percentage of hold-in torque and such motors may be operated under desirable conditions from the heating standpoint. It is therefore important to adjust the excitation of the main generator with due regard to the auxiliary motors whether or not they operate on constant torque loads.

In accordance with my invention I provide means responsive to variations in the volts per cycle of the main generator for controlling the excitation of the main generator to prevent undesirable operation of the auxiliary motors and to warn the operator that the excitation of the generator needs further adjustment. I also arranged this device so that, if there be a predetermined reduction in the volts per cycle, the main generator will be disconnected from the auxiliary circuit and such circuit supplied from the auxiliary unit. In the arrangement illustrated, this means comprises a constant volts per cycle relay 43. As diagrammatically illustrated this relay comprises a solenoid 44 operating a core 45. The solenoid winding is connected to the main work circuit 5 of the generator 2 through a potential transformer 46. The circuit of the winding 44 has relatively high reactance. This is indicated in the drawing by the reactance 47, although it is to be understood that the solenoid itself may be designed inherently to provide the reactance, making an external reactance unnecessary. As thus arranged, if the voltage of the main generator is reduced without a simultaneous change in frequency, as where the excitation of the main generator is reduced without changing its speed, the winding 44 will be weakened in proportion to the reduction in voltage. If, however, the speed of the main generator is reduced without a simultaneous change in its excitation, there will be no change in the energization of the winding 44. If, for example, the speed of the main generator is reduced so as to reduce its frequency from 60 cycles to 45 cycles, with the excitation kept constant, the voltage of the generator will be reduced in the same proportion, for example, from 2400 volts to 1800 volts. The number of volts per cycle is, however, 40 in each case. Owing to the high reactance of the winding 44 and its relatively low resistance, practically the entire change in voltage occurs in the reactance. The reduction of the counter electromotive force of self-induction due to the decreased frequency permits practically the same amount of current to flow through the winding 44 with only 1800 volts impressed at 45 cycles as flows through this winding with 2400 volts impressed at 60 cycles.

If during operation of the ship the volts per cycle fall below the predetermined desired value, the core 45 of the volts-per-cycle relay 43 will move downwardly and permit the contact 48 to close thereby closing a circuit for a relay 49 which will then be energized to close a contact 50 and establish a shunt around the rheostat 40 to increase the excitation of the main generator. This will bring up the volts per cycle and cause the relay 43 again to open the contact 48 and thereby open the contact 50 and reinsert resistance 40. The relay 43 may therefore vibrate to cut in and out the resistance 40 to control the excitation of the generator and prevent the auxiliary motors from falling out of step. This operation of the relay 43 also warns the operator that the excitation of the main generator should be changed, and he may do this in the arrangement illustrated by manual adjustment of the rheostat 40. If the volts per cycle fall below a value such that the auxiliary motors might fall out of step, the core 45 of the relay 43 will upon further downward movement open the contact 30 thus deenergizing the control circuit for the switch 9 thereby to disconnect the main generator 2 from the auxiliary circuit 8, at which time the auxiliary unit comprising the prime mover 13 and dynamo-electric machine 12 will operate to supply power to the auxiliary circuit in the same manner that it does when the stop device 24, for example, is moved to open the contact 25 and deenergize the control circuit.

While I have illustrated the means comprising the constant volts-per-cycle relay 43 as arranged to control the resistance in the excitation circuit of the main generator in a single step it is apparent to those skilled in the art that the relay may be arranged to vary the resistance in the generator field circuit gradually. For example, the relay 43 may be provided with contacts which operate a servo-motor in one direction or the other when the departure from the desired value of volts per cycle exceeds a predetermined range.

While I have shown the contact 25 of the stop device, the contact 29 of the governing means of the auxiliary unit, and the contact 30 of the volts-per-cycle relay 43 as all connected in series in the control circuit for conjoint control of the switch 9 for disconnecting the main generator from the auxiliary circuit, it will be apparent to those skilled in the art that such conjoint operation may be secured in other ways without departing from my invention.

While in the discussion of the operation of the volts-per-cycle relay I refer to particular voltages and frequencies for simplicity of description it is to be understood that this is for descriptive purposes only. The volts-per-cycle relay 43 may be arranged so that, if the main generator voltage drops to approximately 2150 volts at 60 cycles, corresponding to 3600 R. P. M. of the main generator, or to approximately 1600 volts at 45 cycles, corresponding to 2700 R. P. M. of the main generator, this relay will cause closing of the contact 50 short-circuiting the generator field rheostat. When the voltage has increased to approximately 2600 volts at 60 cycles or 1950 volts at 45 cycles the relay will cause contact 50 to open inserting the rheostat. While I have referred to this action of the relay to prevent falling out of step of the auxiliary motors it will be understood that it also prevents the main propulsion motor from falling out of step.

In the power system I have illustrated and described, the current for exciting the main generator 2 and the dynamo-electric machine 12 is supplied from the exciter 20 which exciter is driven under one condition of operation by the machine 12 operating as a motor and under the other condition of operation by the prime mover 13. The arrangement thus provides a dual drive for the exciter and this dual drive unit is never idle. It will be understood, however, that another exciter might be connected on the shaft of the main turbine if desired without departing from my invention. Such an additional exciter merely makes it possible to operate the main turbine driven generator without operating the auxiliary unit since in that case the excitation may be provided from the other exciter. If, however, the speed of the main turbine is to be reduced below a predetermined value it becomes necessary to have the auxiliary source of supply and also to transfer the excitation of the main generator to the exciter on the auxiliary unit. It will also be apparent to those skilled in the art in the light of the foregoing disclosure that my invention is advantageous for insuring proper operation of the auxiliary equipment even though the excitation for the main generator 2 and the dynamo-electric machine 12 be obtained from an entirely independent unit. By providing the dual drive for the exciter, however, the advantage of operating that unit at the water rate of the main turbine whenever the speed of the main turbine is suitable is retained.

In the drawing I have illustrated an additional load circuit 51 for supplying the unloading equipment of the ship. A cargo boat is sometimes provided with unloading equipment such as a belt conveyor, for example. The amount of power required for operating the motors to unload the ship is relatively large in practice, in fact too large to be carried by the normal sea-going auxiliary unit. Therefore I have shown this circuit 51 as arranged to be connected to the main work circuit 5 thorugh suitable switching means diagrammatically illustrated as a remotely controlled switch 52. As to the auxiliary equipment on the circuit 8, however, this may be operated from the auxiliary unit without operation of the main turbine and generator.

While I have illustrated an embodiment of my invention in which the propeller is electrically driven instead of driven through a mechanical transmission such as a geared drive and have illustrated the main generator as an alternating current generator, it will be apparent to those skilled in the art in the light of my disclosure that my invention is not limited in its application to the particular type of system shown, but that many features thereof are applicable to other systems of ship propulsion and to power systems other than ship propulsion. It will also be apparent to those skilled in the art that many changes and modifications may be made in the particular devices and connection shown without departing from my invention and I therefore aim in the appended claims to cover all such changes and modifications as fall within the true spirit and scope of my invention.

What I claim as new and desire to secure by Letters Patent of the United States is:

1. An electric power system comprising a prime mover driven generator, a load circuit normally supplied from said generator, means for adjusting the speed of said prime mover, switching means between said load circuit and said generator, an auxiliary source of supply connected to said load circuit and means controlled in accordance with the position of said speed adjusting means, for operating said switching means to disconnect said generator from said load circuit.

2. An electric power system comprising a main generator and a load circuit normally supplied thereby, means for driving said generator arranged to operate over a relatively wide speed range, an auxiliary unit comprising a dynamo-electric machine connected to said load circuit adapted to operate as a motor or a generator and a prime mover adapted to be driven by said machine when operating as a motor and adapted to drive said machine as a generator, a governor for controlling the prime mover of said auxiliary unit arranged to cause said prime mover to drive said dynamo-electric machine when the speed of the unit falls below a predetermined value and means controlled by said governor for disconnecting said main generator from said load circuit when said prime mover operates said dynamo-electric machine as a generator.

3. An electric power system comprising a main generator and a prime mover for driving the same, means for controlling the speed of said prime mover through a relatively wide range, a work circuit connected to said generator, a switch for connecting said generator to said work circuit to supply the same, an auxiliary unit comprising a dynamo-electric machine and prime mover, said dynamo-electric machine being arranged to be connected to said work circuit whereby said dynamo-electric machine may operate as a motor supplied from the work circuit or as a generator to supply power thereto, speed responsive means for controlling the prime mover of said auxiliary unit arranged to cause the prime mover of the unit to drive the dynamo-electric machine as a generator when the speed of the unit decreases below a predetermined value and means controlled by said speed controlling means and by said speed responsive means for opening said switch to disconnect said main generator from the work circuit.

4. An electric power system comprising a main synchronous dynamo-electric machine, an adjustable speed prime mover for driving said machine, a work circuit supplied from said main machine, an auxiliary circuit, a switch for connecting said main machine to said auxiliary circuit to supply the same, an auxiliary synchronous dynamo-electric machine connected to said auxiliary circuit and adapted to operate as a motor therefrom, a prime mover adapted to drive said auxiliary machine as a generator to supply said auxiliary circuit, means for opening said switch to prevent flow of power from the auxiliary circuit to the work circuit and means for increasing the excitation of the auxiliary machine when said switch is closed and decreasing said excitation when the switch is opened.

5. An electric power system comprising a main synchronous dynamo electric machine, means for adjusting the speed of said machine through a relatively wide range, a load circuit supplied by said machine, an auxiliary source connected to supply said load circuit, a switch between said main machine and said load circuit, means connected to said main generator and responsive directly to the voltage and inversely to the frequency to operate in accordance with the volts per cycle thereof, and means controlled by said volts-per-cycle means for opening said switch to disconnect said main machine from the auxiliary circuit when the volts-per-cycle thereof fall below a predetermined value.

6. An electric power system comprising a main alternating current generator, means for adjusting the speed thereof, main and auxiliary load circuits supplied by said generator, an auxiliary synchronous machine adapted to float on said auxiliary circuit, means operative to drive said auxiliary machine as a generator to supply power to said auxiliary circuit when the speed of said auxiliary machine tends to fall below a predetermined value, a switch between the main generator and the auxiliary circuit, and means responsive to variations in the volts per cycle of said main generator for increasing the excitation thereof when the volts-per-cycle fall below a predetermined value and for opening said switch to disconnect the main generator from said auxiliary circuit if the volts per cycle fall below a predetermined value.

7. An electric power system comprising a synchronous generator, a prime mover for driving the same, an adjustable speed governor for said prime mover, main and auxiliary load circuits supplied by said generator, an auxiliary synchronous dynamo-electric machine arranged to be connected to float on said auxiliary circuit, a prime mover adapted to drive said auxiliary machine as a generator to supply said load circuit, a governor for controlling the prime mover of the auxiliary generator arranged to increase its driving power when its speed tends to fall below a predetermined value, and means for increasing the excitation of said generator and for disconnecting said generator from said auxiliary circuit comprising a device responsive to a predetermined reduction in the volts-per-cycle of said generator.

8. An electric power system comprising a main source of alternating current, a load circuit normally supplied thereby, a switch between said main source and said load circuit, an auxiliary unit comprising a synchronous dynamo-electric machine and a prime mover, said dynamo-electric machine being arranged to float upon said load circuit with its field strongly excited for power factor correction, means arranged to operate when said auxiliary unit becomes operative to supply power to said load circuit and to said main source for opening said switch to disconnect said main source from the load circuit and means interlocked with said switch to decrease the excitation of said dynamo-electric machine when the switch opens.

9. An electric ship propulsion system comprising a main synchronous generator, an elastic fluid turbine for driving said main generator, means comprising a governor and speed adjusting lever to control the operation of said turbine, a propeller driving motor supplied from said main generator, an auxiliary load circuit and a switch for connecting the same to said main generator to be supplied thereby, a dual drive unit comprising an elastic fluid turbine and a synchronous dynamo-electric machine connected to said auxiliary load circuit and an exciter for said generator and said dynamo-electric machine, speed responsive means for admitting fluid to operate said dual drive unit to supply power to the auxiliary load circuit when the speed tends to fall below a predetermined value, a device responsive to changes in the volts-per-cycle of said main generator and means for operating said switch to disconnect said main generator from said auxiliary load circuit cooperatively controlled by said speed adjusting lever, said volts-per-cycle device and the means for admitting fluid to the turbine of the dual drive unit.

10. An electric power system comprising a main synchronous generator, means for driving the same, a load circuit comprising a work motor supplied from said generator, means for adjusting the speed of said driving means to control the speed of said generator and work motor, an auxiliary load circuit also supplied from said generator, an auxiliary unit comprising a synchronous dynamo-electric machine and means adapted to drive the same, means for connecting said dynamo-electric machine to said auxiliary load circuit whereby said dynamo-electric machine may operate as a synchronous motor supplied from said main generator and as a synchronous generator to supply said auxiliary circuit, and means cooperating with said speed adjusting means for disconnecting said auxiliary load circuit from said main generator when said speed adjusting means is operated to a predetermined position.

11. An electric power system comprising a generator, a steam turbine for driving said generator, a governor comprising a speed adjusting lever for controlling the speed of said turbine, a load circuit normally supplied from said generator, circuit controlling means for connecting said load circuit to said generator, an auxiliary unit comprising a steam turbine and dynamo-electric machine adapted to operate as a motor or a generator connected to said load circuit, governing means for the turbine of the auxiliary unit arranged to admit steam to the turbine when its speed falls below a predetermined value, means cooperating with said speed adjusting lever for operating said circuit controlling means to disconnect said generator from said load circuit when said speed lever is operated to reduce the speed of said generator below a value substantially corresponding to that at which the governor of the turbine of the auxiliary unit admits steam to the turbine of said unit.

12. In an electric ship-propulsion system, in combination, a main dynamo-electric machine, a prime mover for driving said main machine, a propulsion motor connected to said main machine, said prime mover being operable over a wide range of speed to vary the frequency and the voltage developed by said main machine to control the speed of operation of the propulsion motor, an auxiliary circuit, an auxiliary dynamo-electric machine, an auxiliary prime mover for driving said auxiliary machine, means for connecting said auxiliary circuit and machine to the main machine, said auxiliary machine being operated as a motor, and means for disconnecting said auxiliary circuit and auxiliary machine from the main machine, when the frequency of the current of the main machine falls below a predetermined value, and causing the auxiliary prime mover to operate the auxiliary machine as a generator whereby the main and auxiliary machines are caused to operate independently to supply current at different frequencies to the propulsion motor and auxiliary circuit respectively.

13. In an electric power system comprising a main prime mover, a main dynamo-electric machine mechanically connected thereto, means for adjusting the speed of said prime mover through a relatively wide range, a load circuit having auxiliary equipment connected thereto adapted to be supplied from said main dynamo-electric machine, an auxiliary prime mover, an auxiliary dynamo-electric machine connected to said load circuit, said auxiliary dynamo-electric machine adapted to operate as a motor to drive said auxiliary prime mover, and a generator driven thereby, and means responsive to an electrical characteristic of the main dynamo-electric machine for disconnecting said generator from said load circuit.

14. An electric power system comprising a prime mover driven generator, a load circuit normally supplied from said generator, means for adjusting the speed of said prime mover, switching means between said load circuit and said generator, an auxiliary source of supply connected to said load circuit and means cooperating with said speed adjusting means having an operative and an inoperative position, said means limiting the range of movement of said speed adjusting means when in its operative position and operating said switching means to disconnect said generator from said load circuit when moved to its inoperative position.

In witness whereof, I have hereunto set my hand this 31st day of October, 1927.

ALEXANDER KENNEDY, Jr.